United States Patent
Lee et al.

(10) Patent No.: US 12,493,323 B2
(45) Date of Patent: Dec. 9, 2025

(54) DISPLAY DEVICE

(71) Applicant: LG Display Co., Ltd., Seoul (KR)

(72) Inventors: Daljae Lee, Seoul (KR); Sungsik Son, Gumi-si (KR); Hyojin Bang, Changwon-si (KR)

(73) Assignee: LG Display Co., Ltd., Seoul (KR)

( * ) Notice: Subject to any disclaimer, the term of this patent is extended or adjusted under 35 U.S.C. 154(b) by 198 days.

(21) Appl. No.: 18/417,438

(22) Filed: Jan. 19, 2024

(65) Prior Publication Data

US 2024/0255995 A1   Aug. 1, 2024

(30) Foreign Application Priority Data

Jan. 31, 2023   (KR) ........................ 10-2023-0013095

(51) Int. Cl.
*G06F 1/16* (2006.01)
(52) U.S. Cl.
CPC .................................. *G06F 1/1652* (2013.01)
(58) Field of Classification Search
CPC .... G06F 1/1652; G06F 1/1641; G06F 1/1624; G06F 1/1637; G06F 1/1681; G06F 1/1616; G06F 1/16; G06F 1/1601; G06F 1/1656; G06F 1/1626; G06F 1/1635; G06F 1/1639; H05K 5/0217; H05K 5/03; H05K 5/0226; H05K 5/0017; H05K 1/0201; H05K 1/0215; H05K 1/028; H05K 1/111; H05K 1/147; H04M 1/0216; H04M 1/0237
See application file for complete search history.

(56) References Cited

U.S. PATENT DOCUMENTS

| | | | |
|---|---|---|---|
| 11,812,654 B2 | 11/2023 | Jung et al. | |
| 2013/0058063 A1* | 3/2013 | O'Brien | G06F 1/1624 361/807 |
| 2020/0315036 A1* | 10/2020 | Ahn | G06F 1/1652 |
| 2021/0200276 A1* | 7/2021 | Lee | G06F 1/1616 |
| 2021/0278878 A1* | 9/2021 | Shim | G06F 1/1656 |
| 2022/0342448 A1* | 10/2022 | Shin | G06F 1/1624 |
| 2023/0176613 A1* | 6/2023 | Seo | G06F 1/1652 361/679.3 |
| 2023/0217611 A1* | 7/2023 | Lee | G06F 1/1601 361/807 |
| 2024/0219967 A1* | 7/2024 | Wang | G06F 1/1656 |

FOREIGN PATENT DOCUMENTS

KR   10-2022-0031778 A   3/2022

* cited by examiner

*Primary Examiner* — Abhishek M Rathod
(74) *Attorney, Agent, or Firm* — Seed Intellectual Property Law Group LLP

(57) ABSTRACT

Provided is a display device. The display device comprises a display panel including a display area including a first non-folding area, a second non-folding area, and a folding area located between the first non-folding area and the second non-folding area; a first support portion supporting the first non-folding area of the display panel; a second support portion supporting the second non-folding area of the display panel; a third support portion fastened between the first support portion and the second support portion and having a rounded upper surface to support the folding area of the display panel; and a bottom cover located in a direction opposite to the third support portion and fastened to the first support portion and the second support portion.

16 Claims, 16 Drawing Sheets

DISPLAY DEVICE

CROSS-REFERENCE TO RELATED APPLICATIONS

This application claims the benefit of and priority to Korean Patent Application No. 10-2023-0013095 filed on Jan. 31, 2023, in the Republic of Korea, the entire contents of which are hereby expressly incorporated by reference into the present application as if fully set forth herein.

BACKGROUND

Technical Field

The present disclosure relates to a display device, and more particularly, to a display device in which a display panel has a folded and fixed shape.

Description of the Related Art

Recently, as our society advances toward an information-oriented society, the field of display devices for visually expressing an electrical information signal has rapidly advanced. Various display devices having excellent performance in terms of thinness, lightness, and low power consumption, are being developed correspondingly.

Representative display devices include a liquid crystal display (LCD), a field emission display (FED), an electro-wetting display (EWD), an organic light emitting display (OLED), an inorganic light emitting display, quantum dot light emitting display, plasma display device, and the like.

An electroluminescent display, represented by the organic light emitting display, is a self-luminous display and can be manufactured to be light and thin since it does not require a separate light source, unlike the liquid crystal display having a separate light source. In addition, the electroluminescent display has advantages in terms of power consumption due to a low voltage driving, and is excellent in terms of a color implementation, a response speed, a viewing angle, and a contrast ratio (CR). Therefore, electroluminescent displays are expected to be used in various application fields.

In recent years, a flexible display device that is manufactured to display an image even when it is bent or folded like paper has received attention as a next-generation display device. Flexible display devices may be classified into highly durable and unbreakable types, bendable types without breakage, rollable types, foldable types, and the like. Such flexible display devices can have advantages in terms of space utilization, interior design and design aspects, and be used in various application fields.

BRIEF SUMMARY

An object to be achieved by the present disclosure is to provide a folded display device that can display a screen simultaneously on a front surface and a rear surface thereof.

Another object to be achieved by the present disclosure is to provide a display device in which a display panel has a fixed shape after being folded.

Still another object to be achieved by the present disclosure is to provide a display device having a three-divided support structures with a reduced lower bezel.

Objects of the present disclosure are not limited to the above-mentioned objects, and other objects, which are not mentioned above, can be clearly understood by those skilled in the art from the following descriptions.

A display device according to an exemplary embodiment of the present disclosure includes a display panel including a display area including a first non-folding area, a second non-folding area, and a folding area located between the first non-folding area and the second non-folding area; a first support portion supporting the first non-folding area of the display panel; a second support portion supporting the second non-folding area of the display panel; a third support portion fastened between the first support portion and the second support portion and having a rounded upper surface to support the folding area of the display panel; and a bottom cover located in a direction opposite to the third support portion and fastened to the first support portion and the second support portion.

Other detailed matters of the exemplary embodiments are included in the detailed description and the drawings.

According to the present disclosure, it is possible to implement three-divided display areas including a first display area displaying a screen on a front surface, a second display area displaying a screen on a rear surface, and a third display area displaying an auxiliary screen having a curved portion between the first display area and the second display area.

According to the present disclosure, it is possible to reduce a lower bezel area and reduce a size of a bottom cover.

According to the present disclosure, it is possible to implement a display device in which display areas on a front surface and a rear surface thereof are fixed at a specific angle.

The effects according to the present disclosure are not limited to the contents exemplified above, and more various effects are included in the present specification.

DETAILED DESCRIPTION

Figure 1:
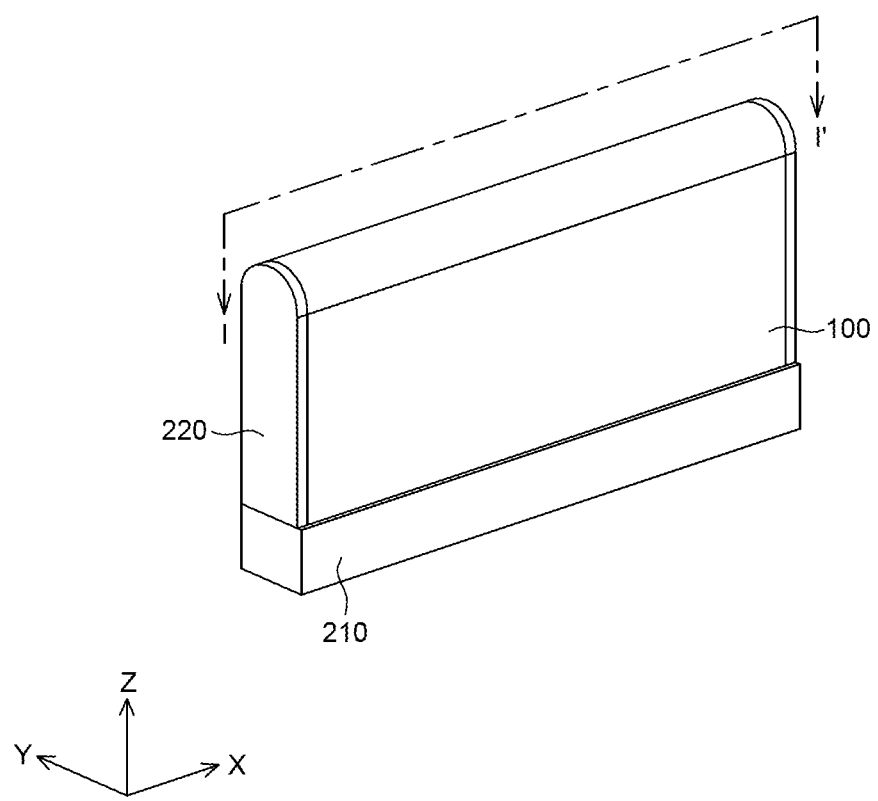
FIG. 1 is a schematic perspective view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including", "containing", "having", "make up of", "formed of", "constituting" and "consist of" used herein are generally intended to allow other components to be added unless the terms are used with a more limiting term such as "merely", "only", etc. Any references to singular may include plural unless expressly stated otherwise.

Components are interpreted to include an ordinary error or tolerance range even if such an ordinary error or tolerance is not expressly stated.

When the position relation between two parts is described using the terms such as "on", "over", "above", "below", "under", "beneath", "adjacent to", "beside" and "next", one or more parts may be positioned between the two parts unless the terms are used with a more limiting term "immediately", "closely" or "directly".

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

When an element or layer is disposed "on" another element or layer, another layer or another element may be interposed directly on the other element or therebetween.

Although the terms "first", "second", "A," "B," "(a)," and "(b)," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

Figure 2:
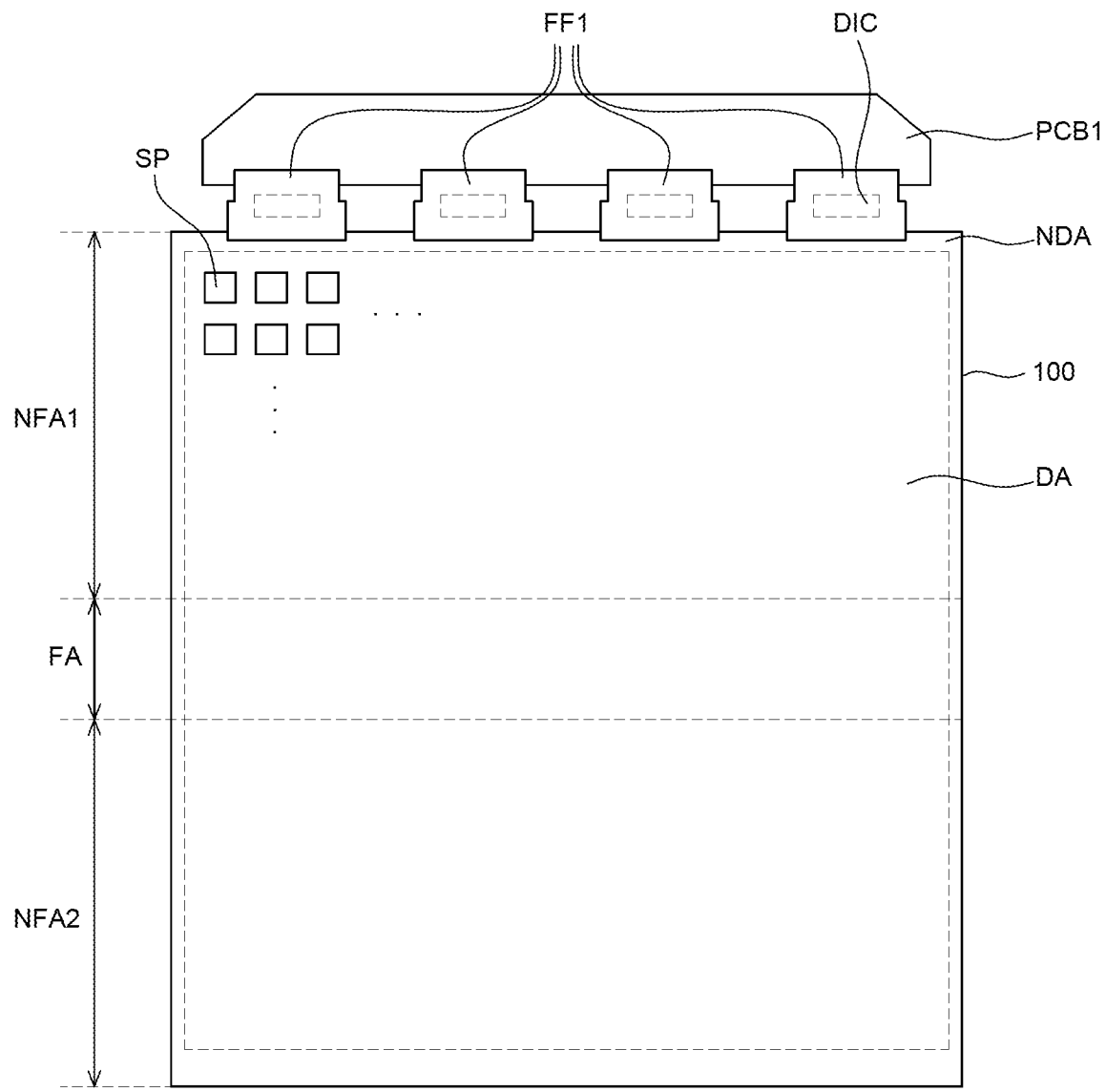
FIG. 2 is a schematic plan view of a display panel in the display device according to an exemplary embodiment of the present disclosure.
Figure 3:
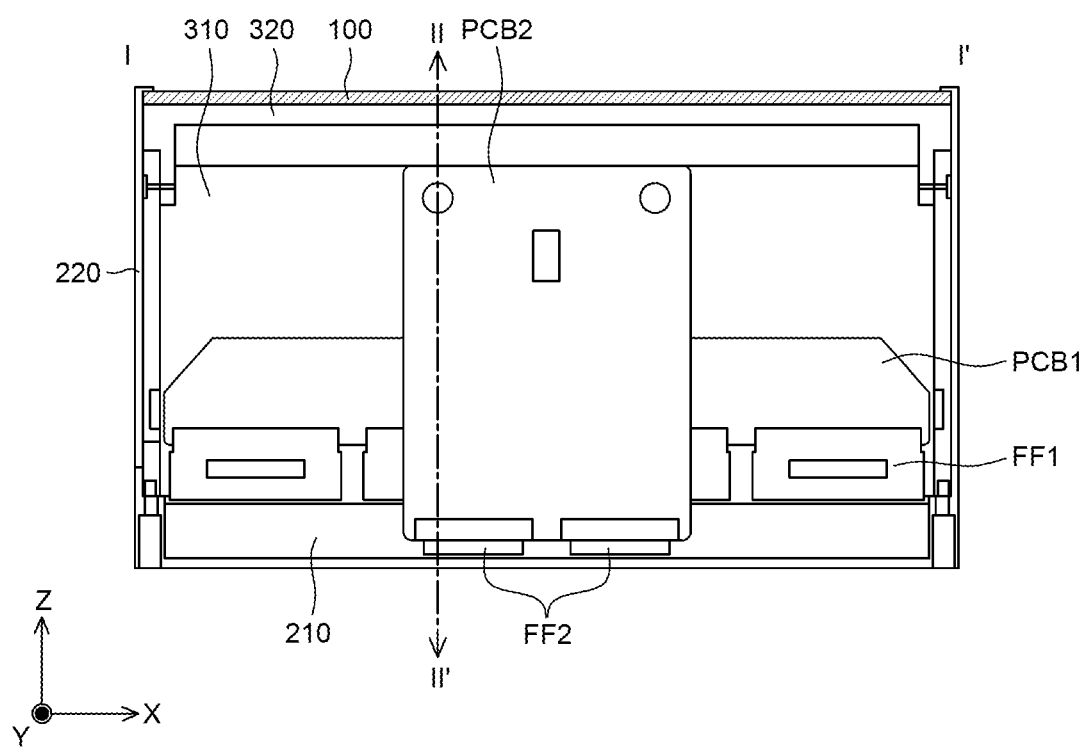
FIG. 3 is a schematic cross-sectional view taken along line I-I' of FIG. 1.
Figure 4:
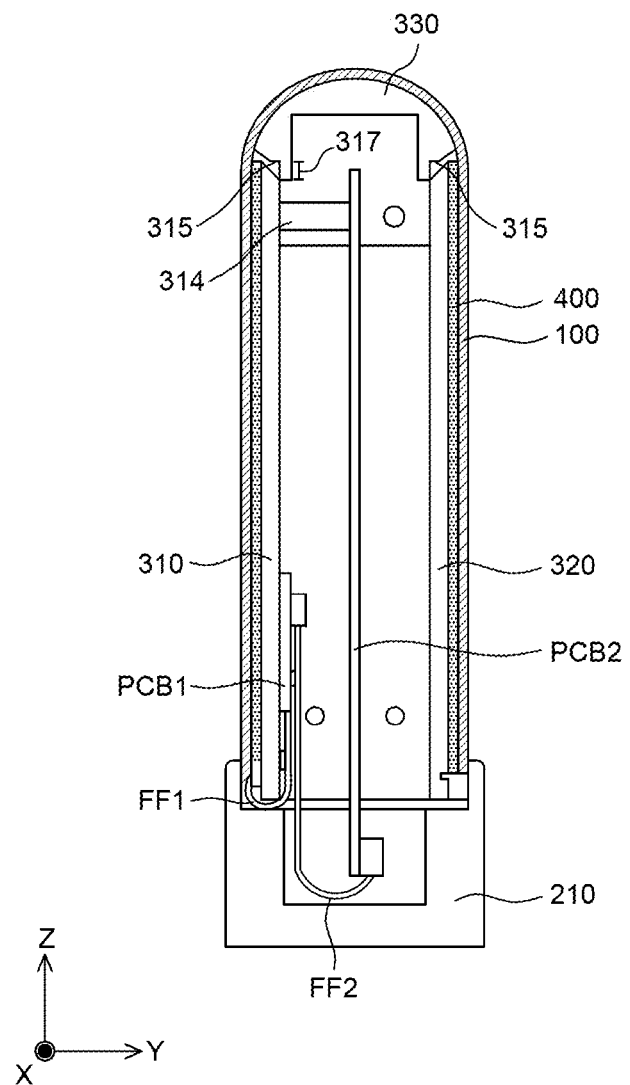
FIG. 4 is a schematic cross-sectional view taken along line II-II' of FIG. 3.

FIGS. 1 to 4 are views for explaining a display device according to an exemplary embodiment of the present disclosure. FIG. 1 is a schematic perspective view of a display device according to an exemplary embodiment of the present disclosure. FIG. 2 is a schematic plan view of a display panel in the display device according to an exemplary embodiment of the present disclosure. FIG. 3 is a schematic cross-sectional view taken along line I-I' of FIG. 1. FIG. 4 is a schematic cross-sectional view taken along line II-II' of FIG. 3.

Meanwhile, FIGS. 5A to 5G are views showing an assembling process of the display device according to an exemplary embodiment of the present disclosure. With reference to FIGS. 5A to 5G, respective components constituting the display device according to an exemplary embodiment of the present disclosure will be described.

Referring to FIG. 1, the display device according to an exemplary embodiment of the present disclosure includes a display panel 100, a bottom cover 210, and side covers 220. The display device may include other components not shown. Hereinafter, for convenience of explanation, descriptions are made assuming that the display device according to an exemplary embodiment of the present disclosure is an organic light emitting display device, but the present disclosure is not limited thereto. The display devices may also include a liquid crystal display, a field emission display, an inorganic light emitting display, quantum dot light emitting display, plasma display device, and the like.

The display panel 100 is a component to display an image to a user and includes a display area DA and a non-display area NDA.

Referring to FIG. 2, the display area DA is an area where a plurality of pixels are disposed to actually display an image or video. The plurality of pixels including emission areas for displaying an image, a plurality of signal lines for transmitting various signals to the plurality of pixels and components such as thin film transistors and capacitors for driving the pixels may be disposed in the display area DA. One pixel may include a plurality of sub-pixels SP. The sub-pixels SP are minimum units constituting the display area, and each of the sub-pixels SP may be configured to emit light in a specific wavelength band. For example, each of the sub-pixels SP may be configured to emit red, green, blue, or white light, but is not limited thereto, and may also be configured to emit light of other colors such as cyan, magenta, black, yellow, etc.

The non-display area NDA (also called a bezel area) outside one side or both sides of the display area DA (e.g., to be adjacent to the display area DA) is disposed to surround the display area DA. The non-display area NDA is an area where images or videos are not substantially displayed, a link wiring and/or a pad electrode for transmitting the signal to the subpixel SP of the display area DA and/or a circuit such as driving ICs of a gate driver IC and a data driver IC and the like can be arranged in the non-display area NDA to drive the pixels and driving elements disposed in the display area DA. For example, various ICs such as a gate driver IC and a data driver IC, VSS lines, and the like may be disposed in the non-display area NDA. Additionally, a pad portion for connection to flexible circuit films may be disposed on one or more sides of the non-display area NDA. The pad portion may be formed of a plurality of pad electrodes.

Additionally, the display panel 100 may be defined as a folding area FA and non-folding areas NFA depending on whether or not it is folded. In the following exemplary embodiments, the display panel 100 is shown as including one folding area FA and two non-folding areas, but the present disclosure is not limited thereto, the number of folding area and the number of non-folding area are not limited to above example. The display panel 100 includes one folding area FA that is foldable and non-folding areas NFA1 and NFA2 other than the folding area FA.

Specifically, the folding area FA is an area that is folded to have a predetermined radius of curvature about a folding axis, and is formed by folding the display panel during a manufacturing process of the display device. Here, the folding axis may be formed in an X-axis direction, but is not limited thereto, and may be formed in any other direction, for example, Z-axis direction. The non-folding areas NFA1 and NFA2 may be located on both sides of the folding area FA along a folding direction. Here, the folding direction may mean a YZ-plane direction perpendicular to the folding axis. When the folding area FA is folded about the folding axis, the folding area FA may form a U-shape, but is not limited thereto, and may form any shape. In this case, a radius of curvature of the folding area FA means a radius of the U-shape formed by the folding area FA. In the display device according to an exemplary embodiment of the present disclosure, the display panel 100 maintains a folded state so that the folding area FA is folded and has a finally determined curvature during the manufacturing process of the display device, but the present disclosure is not limited thereto.

The non-folding areas NFA1 and NFA2 are areas that are not bended when the display device is folded. That is, the non-folding areas NFA1 and NFA2 remain flat when the display device is folded. The non-folding areas NFA1 and NFA2 may extend from both sides of the folding area FA along the folding direction. In this case, the folding area FA may be defined between the non-folding areas NFA1 and NFA2. The non-folding areas NFA1 and NFA2 include a first non-folding area NFA1 and a second non-folding area NFA2. The first non-folding area NFA1 may extend from one side of the folding area FA, and the second non-folding area NFA2 may extend from the other side of the folding area FA. The first non-folding area NFA1 and the second non-folding area NFA2 may overlap each other after the display device is folded.

As described above, the display panel 100 may be divided into the display area DA and the non-display area NDA depending on whether or not an image is displayed, and may be divided into the folding area FA and the non-folding areas NFA1 and NFA2 depending on whether it is folded or not. Accordingly, one portion of the display panel 100 may be the display area DA and at the same time, may include part of the folding area FA and part of non-folding areas NFA1 and NFA2, and other portions of the display panel 100 may be the non-display area NDA and at the same time, may include part of the folding area FA and part of the non-folding areas NFA1 and NFA2. For example, the display area DA of the display panel 100 may be defined as including the folding area FA and the non-folding areas NFA1 and NFA2. For example, the display area DA corresponding to the first non-folding area NFA1 having a planar shape may be defined as a first display area, the display area DA corresponding to the second non-folding area NFA2 having a planar shape may be defined as a second display area facing in a direction opposite to the first display area, and the display area DA corresponding to the folding area FA disposed between the first display area and the second display area and having a predetermined curvature may be defined as a third display area.

Meanwhile, the first non-folding area NFA1 and the second non-folding area NFA2 of the display area DA may allow provision of a display device capable of being viewed in both directions by displaying the same or different images on a front surface or a rear surface thereof, respectively. In this case, the folding area FA of the display area DA may be located upward or downward in a Z-axis direction. The folding area FA may display an auxiliary image between the first non-folding area NFA1 and the second non-folding area NFA2.

The display panel 100 includes a flexible substrate, a driving thin film transistor, display elements and the like. Elements in the display panel are not limited thereto, and may also include for example a switching transistor, a buffer layer, a flattening layer, etc., as necessary, which is not shown. The display panel 100 may be formed by encapsulating a flexible substrate on which a driving thin film transistor and display elements are formed by an encapsulation unit. The display panel 100 includes a thin flexible substrate and display elements disposed on the flexible substrate to implement flexibility.

The flexible substrate supports various elements constituting the display panel 100. The flexible substrate may be formed of a very thin insulating material to implement flexibility. For example, the flexible substrate may be an insulating plastic substrate selected from among polyimide, polyethersulfone, polyethylene terephthalate, polycarbonate, acrylonitrile-butadiene-styrene copolymer(ABS), polymethyl methacrylate (PMMA), polyethylene naphthalate (PEN), polyarylate (PAR), polysulfone (PSF), cyclic olefin copolymer (COC), triacetylcellulose (TAC) film, polyvinyl alcohol (PVA) film, and polystyrene (PS), but is not limited thereto.

The driving thin film transistor for driving the display element may be disposed on the flexible substrate. The driving thin film transistor may be disposed in each of the plurality of pixels. For example, the driving thin film transistor includes a gate electrode, an active layer, a source electrode, and a drain electrode. Additionally, the driving thin film transistor may further include a gate insulating layer to insulate the gate electrode and the active layer, and may further include an interlayer insulating layer to insulate the gate electrode, the source electrode, and the drain electrode.

The display element may be defined differently depending on a type of the display panel 100. For example, when the display panel 100 is an organic light emitting display panel, the display element may be an organic light emitting element including an anode, a light emitting layer, and a cathode. For example, when the display panel 100 is a liquid crystal display panel, the display element may be a liquid crystal display element. When the display panel 100 is a monochromatic LED display panel, the LED may be a mini LED with a size of about 300 to 1000 μm or a micro LED with a size of 100 μm or less.

A cover window may be disposed on the display panel 100. The cover window protects the display panel from external impacts and scratches. Accordingly, the cover window may be formed of a material that is transparent and has excellent impact resistance and scratch resistance. Additionally, the cover window protects the display panel 100 from moisture permeated from the outside. Accordingly, the cover window can prevent degradation of display quality due to deterioration of the display panel 100. The cover window having a sufficiently small thickness to be foldable.

The cover window may be implemented as a foldable soft plastic cover to implement thinness and flexibility of the display device. Additionally, the cover window may have a multilayer structure in which various functional layers are stacked. For example, the cover window may include various functional layers such as an external light reflection reduction layer, an anti-glare layer, a fingerprint-proof layer, a UV blocking layer, and a hard coating layer. In addition, a touch panel constituting a touch sensor may be selectively disposed between the display panel 100 and the cover window, as needed.

Referring to FIGS. 2 and 3, first flexible circuit films FF1 are disposed on one side of the display panel 100 (for example, an upper side in the figures). The first flexible circuit film FF1 transmits various signals from a first printed circuit board PCB1 to the display panel 100. For example, the first printed circuit board PCB1 may be a flexible printed circuit board. In this case, driving circuits (e.g., IC chips) may be mounted on the flexible circuit films FF1. Driving circuits DIC may generate data signals or gate signals in response to driving power and various signals transmitted from the first printed circuit board PCB1 and supply the data signals or gate signals to data lines, gate lines and thin film transistors TFT formed in the display panel 100. To this end, the driving circuit DIC may be in the form including both a data driver for generating a data signal and a gate driver for generating a scan signal, or may be in the form in which the data driver and the gate driver are separate. Although it has been described in this disclosure that the driving circuit DIC may be disposed on the first flexible circuit film FF1, the driving circuit may also be disposed directly on a lower substrate. The first flexible circuit film FF1 may be attached to the pad portion provided in the non-display area NDA of the display panel 100 using an anisotropic conducting film (ACF).

The first flexible circuit films FF1 may be formed of a very thin insulating material including plastic such as acryl resin, epoxy resin, polypropylene, phenolic resin, polyamide resin, or polyimide resin or inorganic insulating material such as silicon oxide ($SiO_2$) or silicon nitride (SiNx) to support the driving circuits DIC and lines and implement flexibility. The first flexible circuit film FF1 is bent to a rear surface of the display panel 100. At least a portion of the first flexible circuit film FF1 is bent to face the rear surface of the display panel 100, so that the first printed circuit board PCB1 connected to the first flexible circuit film FF1 is disposed on the rear surface of the display panel 100. Through this, a size of the non-display area NDA of the display device can be reduced. The first flexible circuit film may include a plurality of output pads extending in the first direction In FIG. 2, the first flexible circuit film FF1 is shown as a separate component that can be separated from the display panel 100, but in some cases, it may be formed integrally with the display panel 100. For example, one side of the flexible substrate constituting the display panel may be extended to function as the flexible circuit film. In this case, the extended flexible substrate is connected to the first printed circuit board and may be bent toward the rear surface of the display panel 100.

The first printed circuit board PCB1 is attached to the first flexible circuit films FF1. Specifically, the first printed circuit board PCB1 is attached to the other sides of the first flexible circuit films FF1 relative to one sides of the first flexible circuit films FF1 to which the display panel 100 is connected. The first printed circuit board PCB1 transmits various signals to the thin film transistors TFT formed in the display panel 100. For example, signal lines for transmitting various signals such as driving signals, control signals, and data signals are formed on the first printed circuit board PCB1. Meanwhile, the first printed circuit board PCB1 may be referred to as a source printed circuit board (Source PCB; S-PCB) on which the data driver is mounted. The first printed circuit board PCB1 is a component which supplies signals to the driving IC. The first printed circuit board PCB1 supplies various signals such as a driving signal or a data signal to the driving IC.

In FIG. 3, a second printed circuit board PCB2 is connected to the first printed circuit board PCB1. The second printed circuit board PCB2 may be referred to as a control printed circuit board (Control PCB; C-PCB) on which a timing controller and the like are mounted. Specifically, a timing controller, a power source unit and the like may be disposed on the second printed circuit board PCB2. The timing controller can supply various signals to the driving circuit. For example, the timing controller may generate a data driver control signal DDC, a gate driver control signal GDC and the like and supply them to the driving circuit DIC. For example, the second printed circuit board PCB2 may be a flexible printed circuit board.

Second flexible circuit films FF2 connect the first printed circuit board PCB1 and the second printed circuit board PCB2. The second flexible circuit film FF2 transmits signals from the second printed circuit board PCB2 to the first printed circuit board PCB1. For example, a control signal from the timing controller of the second printed circuit board PCB2 may be supplied to the first printed circuit board PCB1. The second flexible circuit film FF2 may be formed of a very thin insulating material including plastic such as acryl resin, epoxy resin, polypropylene, phenolic resin, polyamide resin, or polyimide resin or inorganic insulating material such as silicon oxide ($SiO_2$) or silicon nitride (SiNx) in order to support lines and implement flexibility.

In FIGS. 2 and 3, the first printed circuit board PCB1 and the second printed circuit board PCB2 are shown as separate components, but in some cases, the first printed circuit board PCB1 and the second printed circuit board PCB2 may be formed of a single printed circuit board. An arrangement structure of the first printed circuit board PCB1 and the second printed circuit board PCB2 will be described later with reference to FIG. 3.

The bottom cover 210 is fastened to the side covers 220 to accommodate or protect the display panel 100 and support structures 310, 320, and 330. In this case, the bottom cover 210 may cover a lower bezel of the display panel 100. Referring to FIG. 3, the display panel 100 is folded so that the folding area FA is located upward, and accordingly, the first printed circuit board PCB1 and the first flexible circuit films FF1 connected to one side of the display panel 100 extend downward. As will be described later, the first flexible circuit films FF1 are bent and located to overlap the rear surface of the display panel 100, and bent areas of the first flexible circuit films FF1 are located downward. Accordingly, the bottom cover 210 accommodates at least a portion of the bent area of the first flexible circuit film FF1, and thus has a structure that covers the lower bezel of the display panel 100.

Figure 5A:
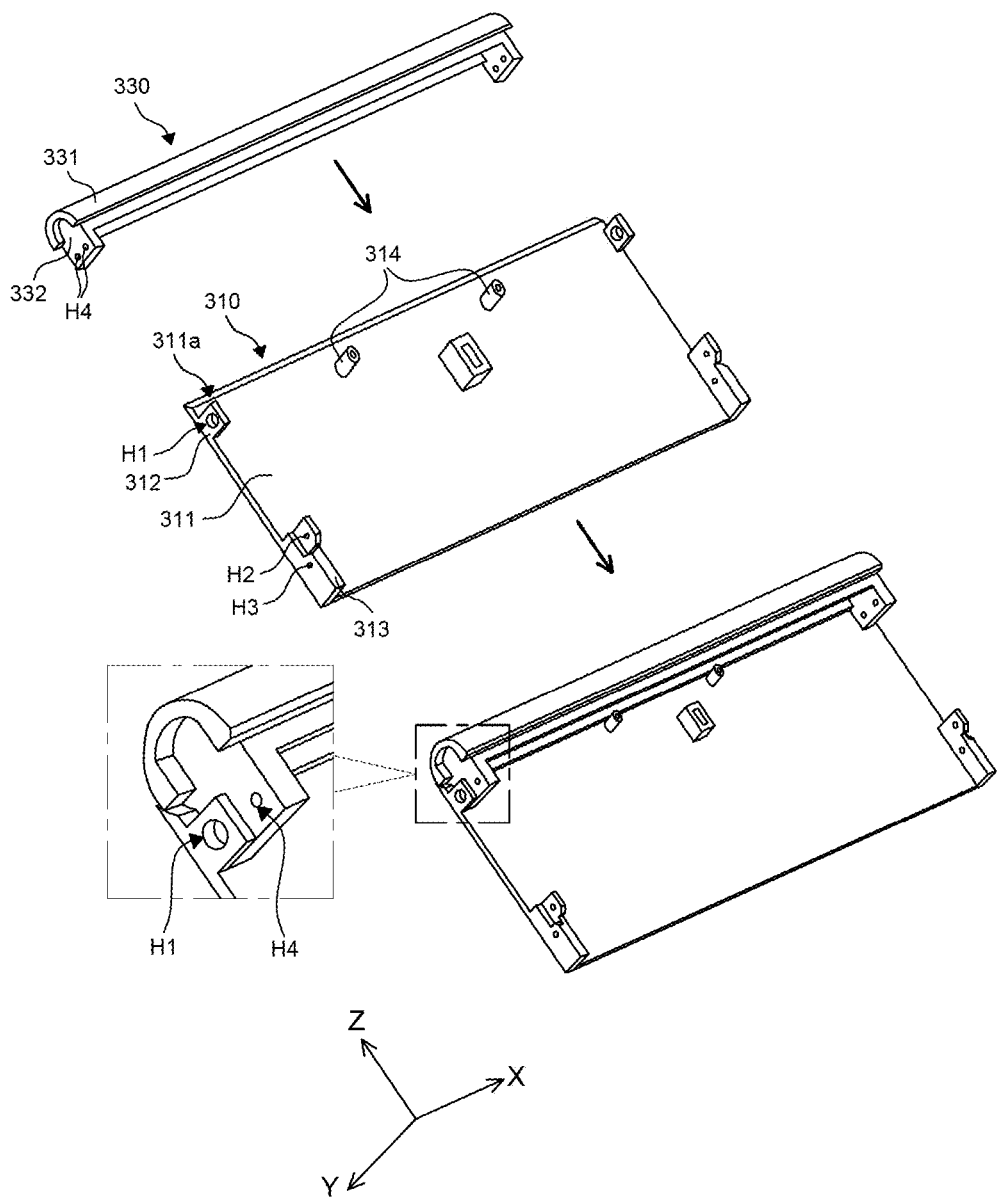
FIGS. 5A to 5G are schematic views showing an assembling process of the display device according to an exemplary embodiment of the present disclosure.
Figure 5B:
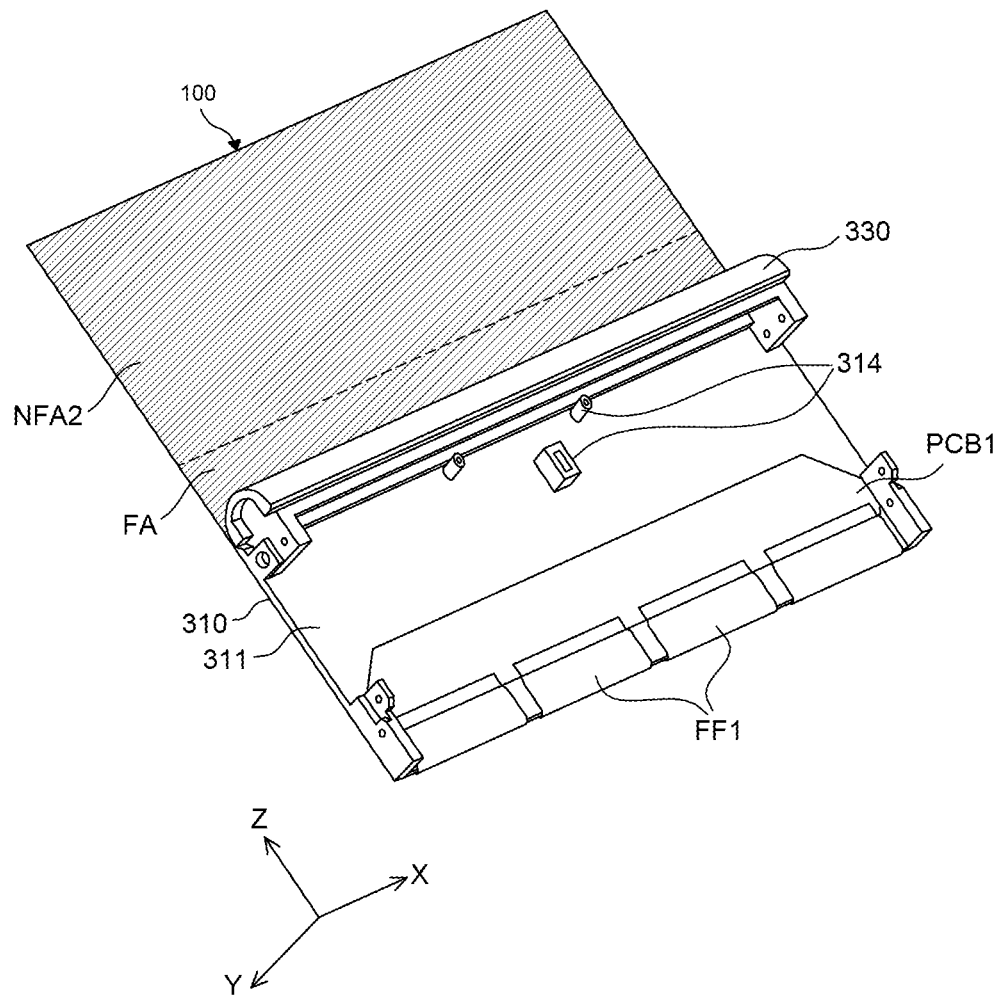
Figure 5C:
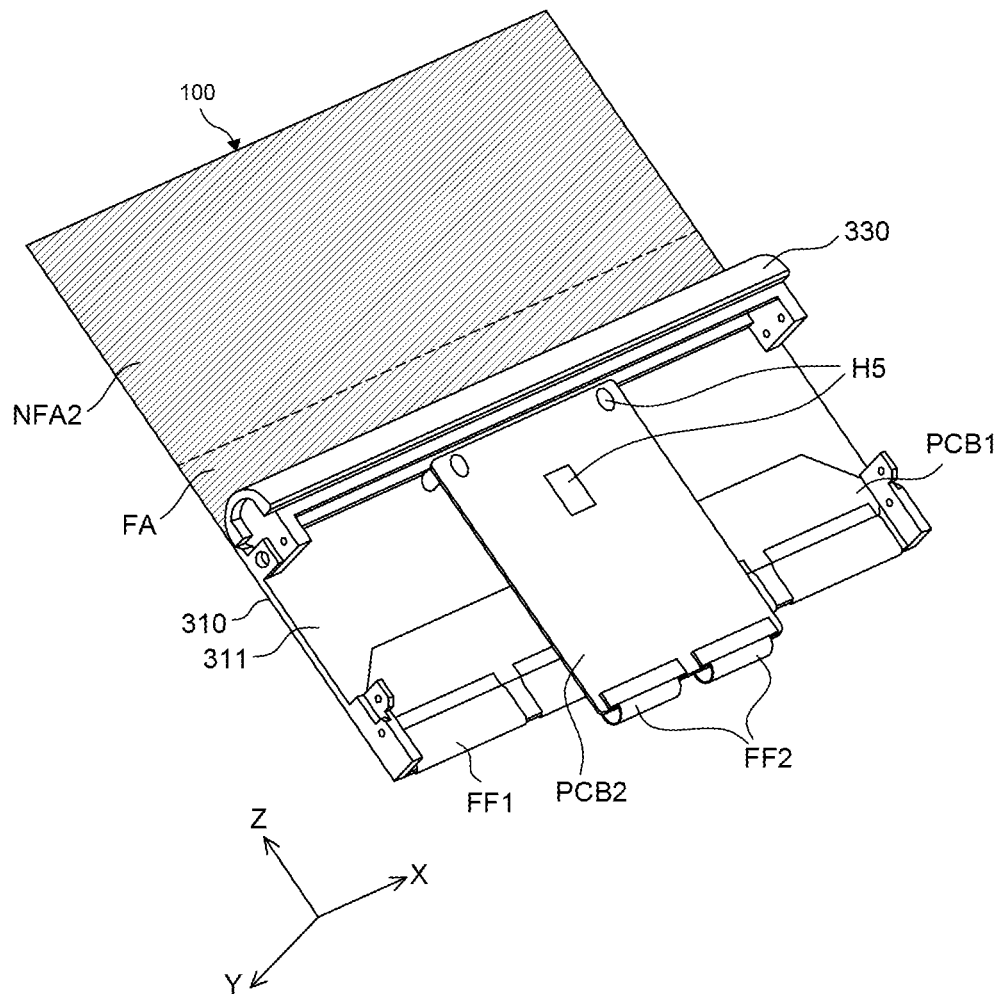
Figure 5D:
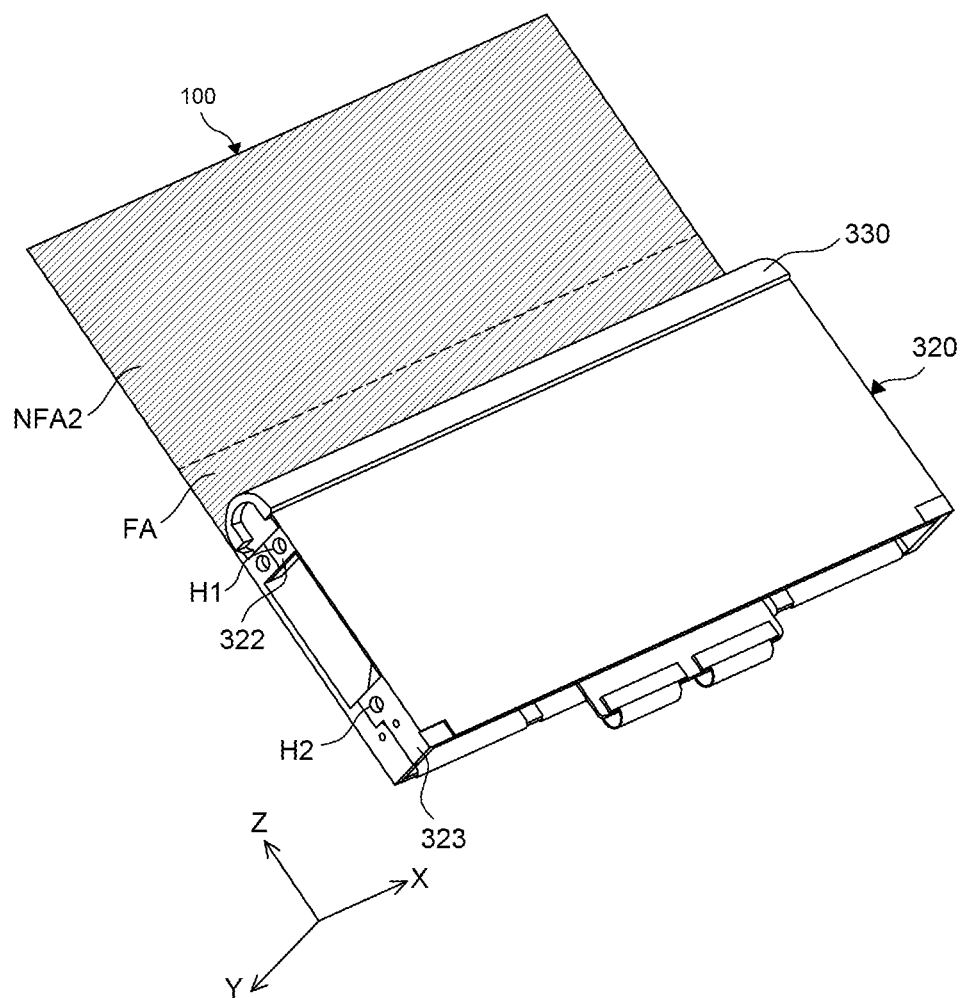
Figure 5E:
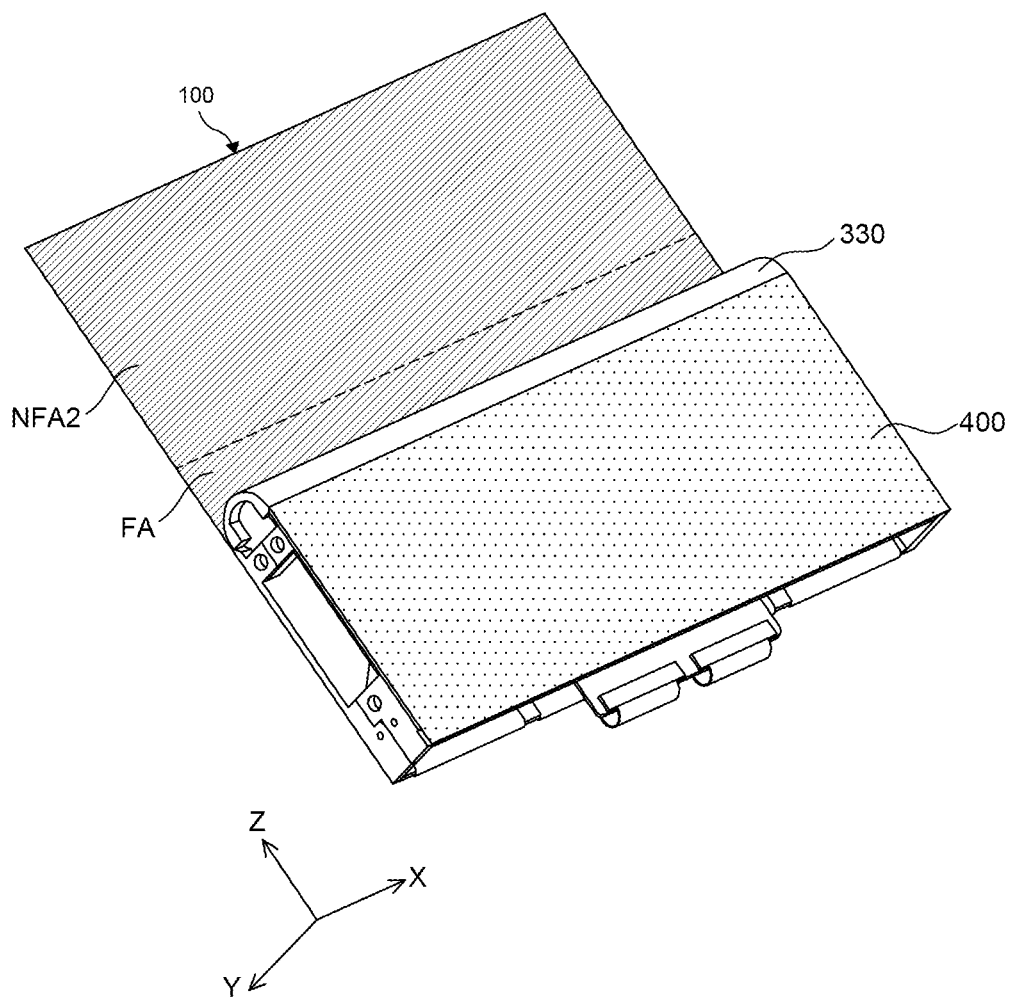
Figure 5F:
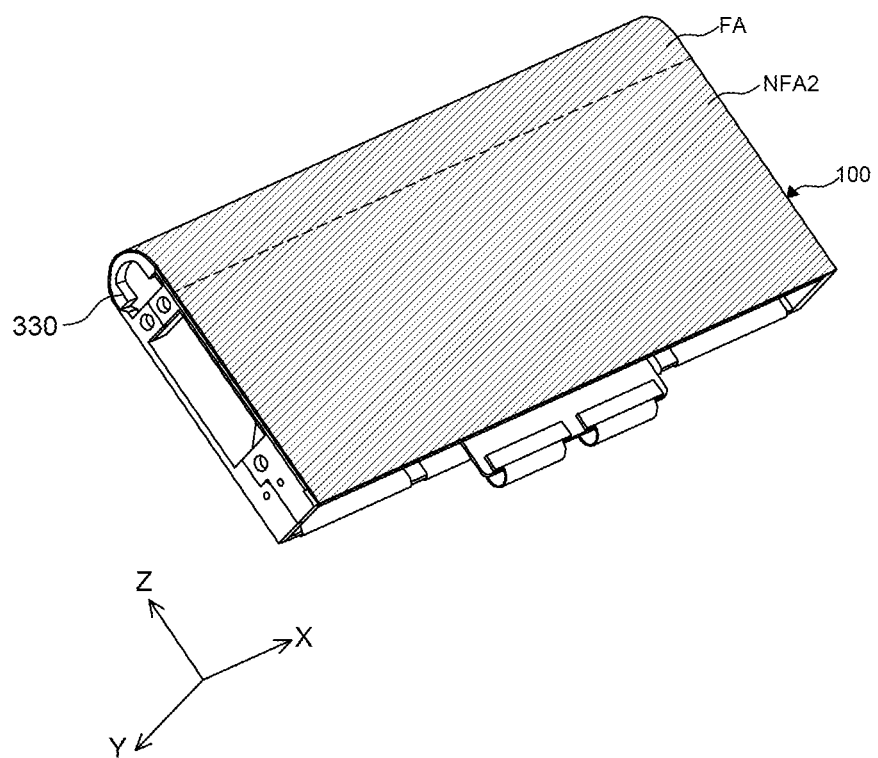
Figure 5G:
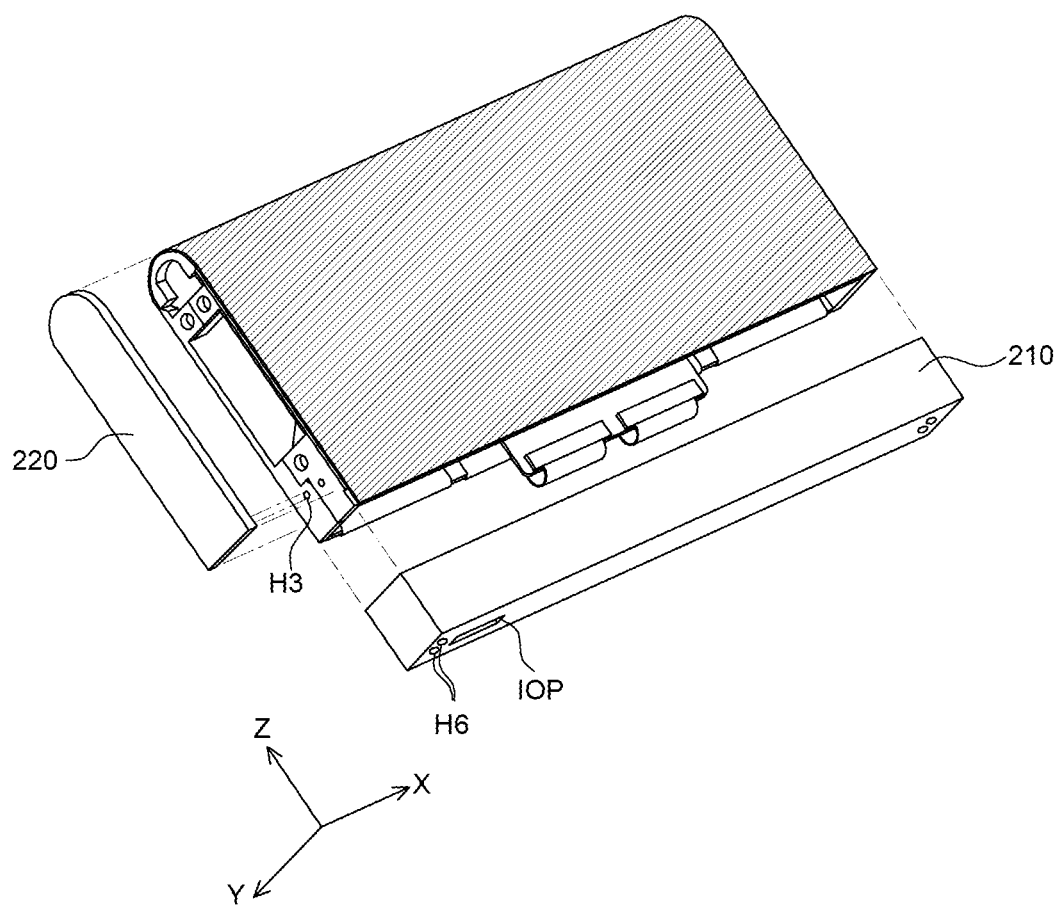

Referring to FIG. 5G, which will be described later, the bottom cover 210 may accommodate a portion of the second printed circuit board PCB2 protruding downward based on a Z-axis and portions of the second flexible circuit films FF2 connected to the second printed circuit board PCB2.

Additionally, the bottom cover 210 supports or fixes the display device thereto. The bottom cover 210 is located on a bottom of the display device and may be connected to other structures. For example, when the display device according to an exemplary embodiment of the present disclosure is used inside for example a car, the bottom cover 210 may be attached and fixed to a dashboard or ceiling of the car.

The side covers 220 are fastened to the bottom cover 210 to protect side surfaces of the display panel 100 and the support structures 310, 320, and 330. The side covers 210 may cover at least a part of the non-display areas NDA1 and NDA2 on both sides of the display panel 100.

Referring to FIG. 4, the support structures 310, 320, and 330 for supporting the display panel 100 are disposed inside the side covers 220. The support structures 310, 320, and 330 include a first support portion 310 for supporting the first non-folding area NFA1 of the display panel 100, a second support portion 320 for supporting the second non-folding area NFA2 of the display panel 100, and a third support portion 330 for supporting the folding area FA of the display panel 100. The first support portion 310 and the second support portion 320 are disposed in parallel to face each other and are disposed to be upright in the Z-axis direction. The third support portion 330 is disposed above (in the Z-axis direction) the first support portion 310 and the second support portion 320 and is fastened to the first support portion 310 and the second support portion 320.

Referring to FIGS. 3 and 4, the first support portion 310 supports the first non-folding area NFA1 of the display panel 100. The first support portion 310 is disposed on a rear surface of the first non-folding area NFA1 of the display panel 100 and may have a quadrangular plate shape. The first support portion 310 has front surface facing the rear surface of the display panel 100, a rear surface 311 facing the second support portion 3202 and an angled upper surface 311a. An adhesive member 400 and the display panel 100 are disposed on the front surface of the first support portion 310. In specific, the adhesive member 400 may be disposed between the display panel 100 and the second support portion 320, and the adhesive member 400 may be disposed between the display panel 100 and the first support portion 310. The first printed circuit board PCB1 connected through the first flexible circuit films FF1 disposed on one side of the display panel 100 is disposed on the rear surface 311 of the first support portion 310. Although omitted in FIG. 4, a separate adhesive member is disposed between the rear surface 311 of the first support portion 310 and the first printed circuit board PCB1 so that the first printed circuit board PCB1 may be attached to the first support portion 310.

Meanwhile, referring to FIG. 5A, a pair of first fastening units 312 and a pair of second fastening units 313 that protrude toward an inside of the display device are formed on edges of the first support portion 310. The first fastening units 312 are components fastened to the third support portion 330 and are formed on both edges of the first support portion 310 adjacent to the third support portion 330. For example, the first fastening units 312 may be located in an upper area in the Z-axis direction. A first fastening hole H1 may be formed in the first fastening unit 312 so that the first fastening unit 312 can be fastened to the third support portion 330. For example, the first fastening hole H1 of the first fastening unit 312 formed on the first support portion 310 and a fourth fastening hole H4 formed in the third support portion 330 may be connected through a screw. The second fastening units 313 are components fastened to the second support portion 320, and are spaced apart from the first fastening units 312 and formed on the both edges of the first support portion 310. For example, the second fastening units 313 may be located in a lower area in the Z-axis direction. A second fastening hole H2 may be formed in the second fastening unit 313 so that the second fastening unit 313 can be fastened to the second support portion 320. For example, the second fastening hole H2 of the second fastening unit 313 formed on the first support portion 310 and a second fastening hole of a second fastening unit formed on the second support portion 320 may be connected through a screw. The second fastening unit 313 may have a step formed in an area where the second fastening hole H2 is formed so that the first support portion 310 and the second support portion 320 are fastened to each other to form a plane. Additionally, a third fastening hole H3 that is connected to the side cover 220 may be formed in the second fastening unit 313. In addition, although not shown in the drawings, a fastening groove that can be connected to the bottom cover 210 may be formed on a lower surface of the second fastening unit 313.

In addition, referring to FIGS. 4 and 5A, protruding support portions 314 that protrude toward the inside of the display device are formed on the rear surface 311 of the first support portion 310 so that the second printed circuit board PCB2 is spaced apart from the rear surface 311 of the first support portion 310 and fixed thereto. The protruding support portion 314 may have a cylindrical or quadrangular pillar shape, but is not limited thereto, and may be other shapes such as prism. The protruding support portion 314 may include a groove to be fastened to the second printed circuit board PCB2 with a connection member such as a screw.

Meanwhile, FIG. 5A shows a structure in which the first fastening unit 312 and the second fastening unit 313 of the first support portion 310 are spaced apart from each other in the Z-axis direction, but the first fastening unit 312 and the second fastening unit 313 may be connected to each other to form one side of the edges of the first support portion 310.

Referring to FIG. 4, the second support portion 320 is disposed parallel to the first support portion 310. The second support portion 320 supports the second non-folding area NFA2 of the display panel 100. The second support portion 320 is disposed on a rear surface of the second non-folding area NFA2 of the display panel 100 and may have a quadrangular plate shape. The second support portion 320 has an upper surface facing the rear surface of the display panel 100 and a rear surface facing the first support portion 310. The adhesive member 400 and the display panel 100 are disposed on the upper surface of the second support portion 320.

Similar to the first support portion 310, a pair of first fastening units and a pair of second fastening units that protrude toward the inside of the display device and fastened to the third support portion 330 and the first support portion 310, respectively may be formed on edges of the second support portion 320. Since configurations of the first fastening unit and the second fastening unit of the second support portion 320 are substantially the same as the first fastening unit 312 and the second fastening unit 313 of the first support portion 310, repeated descriptions will be omitted.

Unlike the first support portion 310, the first printed circuit board PCB1 may not be disposed on a rear surface of the second support portion 320. Additionally, a protruding support portion for supporting the second printed circuit board PCB2 may not be formed on the rear surface of the second support portion 320.

Referring to FIG. 4, the third support portion 330 supports the folding area FA of the display panel 100. The third support portion 330 is disposed on a rear surface of the folding area FA of the display panel 100 and supports the display panel 100 so that the display panel 100 corresponding to the folding area FA has a specific curvature.

Referring to FIG. 5A together, the third support portion 330 includes a curved portion 331 and side portions 332. The curved portion 331 has an upper surface with a predetermined curvature in the Z-axis direction. The curved portion 331 contacts the rear surface of the display panel 100 corresponding to the folding area FA and supports the display panel 100 in a folded form. The curved portion 331 supports the display panel 100 so that a curvature of the folding area FA is maintained constant, thereby preventing deformation of the display panel 100 located in the folding area FA due to external force. The curved portion 331 elongates and extends in the X-axis direction, which is a folding axis direction.

A step 315 is formed at both ends of the curved portion 331 in the Z-axis direction so that upper ends of the first support portion 310 are mounted. In addition, as will be described later, as a step 315 is formed at the end of the curved portion 331, when the adhesive member 400 is disposed on the first support portion 310 that is mounted on the step 315, an upper surface of the adhesive member 400 and the end of the curved portion 331 may form a straight line. For example, a height 317 of the step 315 may be a sum of a thickness of the adhesive member 400 and a thickness of the display panel.

Through this, it is possible to reduce visibility of a boundary between the non-folding area FA and the folding area FA of the display panel 100.

A pair of the side portions 332 are located on both sides in the X-axis direction. The side portion 332 is a component to be fastened to the first support portion 310 and the second support portion 320, and includes two fourth fastening holes H4 that may be respectively connected to the first fastening units of the first support portion 310 and the second support portion 320 on one side thereof. Specifically, the side portion 332 of the third support portion 330 located on one side includes a pair of fourth fastening holes H4 that are fastened to the first fastening unit 312 of the first support portion 310 and the first fastening unit 322 of the second support portion 320. The fourth fastening holes H4 formed in the side portion 332 and the first fastening holes H1 of the first support portion 310 and the second support portion 320 may be connected through screws, respectively.

As can be seen in FIG. 4, the first support portion 310, the second support portion 320, and the third support portion 330 are fastened to one another to support the display panel 100. The first support portion 310 and the second support portion 320 support the display panel 100 in the first non-folding area NFA1 and the second non-folding area NFA2, respectively, and provide a flat display area on a front surface and a rear surface thereof. In addition, the third support portion 330 supports the display panel 100 of the folding area FA and can provide a display area with a constant curvature between the first non-folding area NFA1 and the second non-folding area NFA2.

Referring to FIG. 4, the adhesive member 400 is disposed between the first support portion 310 and the display panel 100 and between the second support portion 320 and the display panel 100, respectively. The adhesive member 400 physically couples the first support portion 310 and the second support portion 320 with the display panel 100 in the non-folding area NFA. The adhesive member 400 may be an adhesive sheet, double-sided tape, or foam tape, a foam pad, a double-sided foam pad, a double-sided foam tape, an adhesive, or the like, but is not limited thereto.

Hereinafter, an arrangement structure and assembling process of components of the display device according to an exemplary embodiment of the present disclosure will be described with reference to FIGS. 5A to 5G.

First, FIG. 5A shows respective shapes of the first support portion 310 and the third support portion 330 and a structure in which the first support portion 310 and the third support portion 330 are fastened to each other. As previously described, through the first fastening hole H1 formed in the first fastening unit 312 of the first support portion 310 and the fourth fastening hole H4 formed in the side portion 332 of the third support portion 330, the first support portion 310 and the third support portion 330 can be fastened and fixed.

Next, FIG. 5B shows a structure in which the display panel 100 is attached to the first support portion 310. The adhesive member 400 is disposed on the upper surface of the first support portion 310 fastened to the third support portion 330, and the display panel 100 is attached to the adhesive member 400. The display panel 100 disposed on the first support portion 310 may configure the first non-folding area NFA1 and implement a planar shape. In this case, the folding area FA and the second non-folding area NFA2 of the display panel 100 are disposed to extend toward the third support portion 330.

Meanwhile, the first flexible circuit film FF1 connected to the pad portion formed in the non-display area NDA of the display panel 100 and the first printed circuit board PCB1 connected to the first flexible circuit film FF1 are disposed to protrude in a direction opposite to the third support portion 330. Thereafter, as shown in FIGS. 4 and 5B, by bending the first flexible circuit film FF1 toward the rear surface of the first support portion 310 so that the first flexible circuit film FF1 surrounds the bottom of the first support portion 310, at least a portion of the first flexible circuit film FF1 and the first printed circuit board PCB1 are disposed to overlap the rear surface 311 of the first support portion 310. In this case, the first printed circuit board PCB1 can be attached and fixed to the first support portion 310 by disposing a separate adhesive member between the first printed circuit board PCB1 and the rear surface of the first support portion 310. The first flexible circuit film FF1 is bent to attach the first printed circuit board PCB1 to the rear surface 311 of the first support portion 310, so that the first flexible circuit film FF1 may be disposed to overlap the display panel 100. Therefore, a bezel area at the bottom of the display panel 100 can be reduced.

Next, FIG. 5C shows a structure in which the second flexible circuit film FF2 and the second printed circuit board PCB2 are disposed. The second flexible circuit film FF2 is attached to the other side of the first printed circuit board PCB1, which is different from the one side thereof to which the first flexible circuit film FF1 is attached. The second flexible circuit film FF2 extends downward in the Z-axis direction and is then bent upward again.

The second flexible circuit film FF2 is connected to the second printed circuit board PCB2. In this case, the second printed circuit board PCB2 is mounted on a plurality of the protruding support portions 314 formed on the first support portion 310. In the second printed circuit board PCB2, fifth fastening holes H5 may be formed to be fastened to the plurality of protruding support portions 314 of the first support portion 310. For example, the fifth fastening hole H5 of the second printed circuit board PCB2 and the protruding support portion 314 may be connected through a screw. The second printed circuit board PCB2 may be disposed to be spaced apart from the rear surfaces of the first support portion 310 and the second support portion 320 by the protruding support portions 314. That is, since the second printed circuit board PCB2 is located to be spaced apart from the rear surface 311 of the first support portion 310 by the protruding support portions 314, the first printed circuit board PCB1 may be disposed between the first support portion 310 and the second printed circuit board PCB2. Therefore, since the display panel 100, the first printed circuit board PCB1, and the second printed circuit board PCB2 can be located to overlap one another at the same time, there is no need to provide a separate area for placing the first printed circuit board PCB1 and the second printed circuit board PCB2, so a bezel area of the display device can be reduced.

Next, FIG. 5D shows a structure in which the second support portion 320 is disposed. As described above, the second support portion 320 is disposed to face the first support portion 310. Through the first fastening hole H1 formed in the first fastening unit 322 of the second support portion 320 and the fourth fastening hole H4 formed in the side portion 332 of the third support portion 330, the second support portion 320 and the third support portion 330 may be fastened and fixed. In addition, through the second fastening hole H2 formed in the second fastening unit 323 of the second support portion 320 and the second fastening hole H2 formed in the second fastening unit 313 of the first support portion 310, the first support portion 310 and the second support portion 320 can be fastened and fixed.

Next, FIG. 5E shows a structure in which the adhesive member 400 is disposed. The adhesive member 400 is disposed on the upper surface of the second support portion 320. The adhesive member 400 may be an adhesive sheet, double-sided tape, or foam tape, but is not limited thereto.

Next, FIG. 5F shows a structure in which the display panel 100 is folded and attached to the second support portion 320. The display panel 100 is folded along the curved portion 331 of the third support portion 330. The display panel 100 is folded so that the folding area FA of the display panel 100 directly contacts or is in close contact with an upper surface of the curved portion 331 of the third support portion 330. Thereafter, the second non-folding area NFA2 of the display panel 100 is attached to the adhesive member 400 located on the upper surface of the second support portion 320. The display panel 100 is bonded and fixed to the first support portion 310 and the second support portion 320 in the first non-folding area NFA1 and the second non-folding area NFA2 by the adhesive member 400 disposed on the upper surfaces of the first support portion 310 and the second support portion 320. However, the display panel 100 is not bonded or fixed to the third support portion 330 in the folding area FA using a separate adhesive member.

Next, FIG. 5G shows a structure in which the bottom cover 210 and the side cover 220 are disposed. First, the side cover 220 is disposed on a side surface of the display device. Specifically, the side cover 220 may be disposed to contact side surfaces of the first support portion 310 and the second support portion 320. For example, the side cover 220 may be attached to side surfaces of the first support portion 310 and the second support portion 320 that are fastened to each other through an adhesive layer, or may be fastened to the side surfaces of the first support portion 310 and the second support portion 320 through the third fastening holes H3 formed in the second fastening units of the first support portion 310 and the second support portion 320.

Thereafter, the bottom cover 210 is disposed on the bottom of the display device. Specifically, the bottom cover 210 may be fastened through fastening grooves formed in a lower surface of the second fastening unit. The bottom cover 210 may include sixth fastening holes H6 so as to be connected to the fastening grooves of the first support portion 310 and the second support portion 320. For example, the fastening groove of the second fastening unit 313 of the first support portion 310 and the sixth fastening hole H6 formed in the bottom cover 210 may be connected through a screw. Additionally, the sixth fastening hole H6 may be connected to a structure located outside the display device. The bottom cover 210 includes an accommodation space in an inside thereof and can accommodate a portion of the second printed circuit board PCB2 and a portion of the second flexible circuit film FF2 connected to the second printed circuit board PCB2.

The bottom cover 210 includes a draw-out portion IOP through which the flexible circuit film for transmitting a signal from the outside of the display device to the first printed circuit board PCB1 or the second printed circuit board PCB2 disposed inside the display device can be drawn-out. The draw-out portion IOP is an open portion that has a size corresponding to the flexible circuit film connected to the inside of the display device. Additionally, power may be supplied from the outside to the inside of the display device through the draw-out portion IOP. However, the display device is not limited thereto and may be supplied with power through a separate battery mounted inside the bottom cover 210.

A display device according to an exemplary embodiment of the present disclosure provides a display device in which a display panel is folded and fixed. The display device according to an exemplary embodiment of the present disclosure supports the display panel through a first support portion and a second support portion having a plate shape and fastened to each other and a third support portion having a curved portion. Through this composite support structure, a display device having three-divided display areas including a first display area corresponding to the first non-folding area of a planar shape, a second display area corresponding to the second non-folding area of a planar shape and facing in a direction opposite to the first display area, and a third display area disposed between the first display area and the second display area and corresponding to the folding area having a specific curvature can be implemented.

Additionally, the display device according to an exemplary embodiment of the present disclosure forms a space inside the support structure to accommodate a printed circuit board. In this case, protruding support portions are formed on the first support portion that has a plate shape and provides the non-folding area, and the first printed circuit board may be disposed on the rear surface of the first support portion, and the second printed circuit board may be disposed on the protruding support portion to be spaced apart from the rear surface of the first support portion. Through this, the display panel, the first printed circuit board, and the second printed circuit board can be disposed to overlap one another. Because of this, a separate non-display area for arranging the printed circuit board can be reduced, thereby significantly reducing a bezel area of the display panel.

Figure 6:
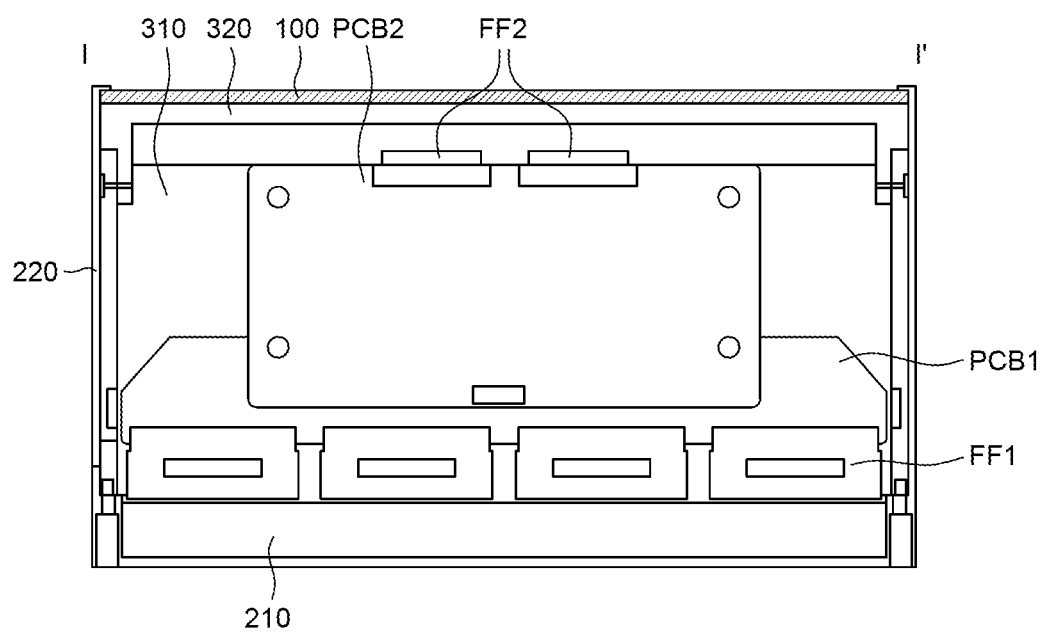
FIG. 6 is a schematic cross-sectional view of a display device according to another exemplary embodiment of the present disclosure.
Figure 7:
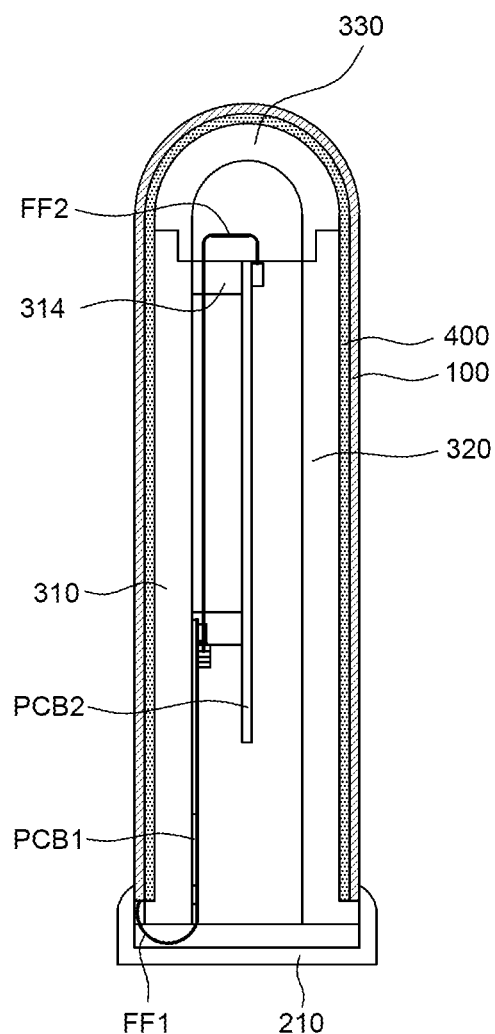
FIG. 7 is a schematic cross-sectional view taken along line III-III' of FIG. 6.

FIGS. 6 and 7 are views for explaining a display device according to another exemplary embodiment of the present disclosure. FIG. 6 is a schematic cross-sectional view of a display device according to another exemplary embodiment of the present disclosure. FIG. 7 is a schematic cross-sectional view taken along line III-III' of FIG. 6.

The display device shown in FIGS. 6 and 7 are identical to the display device shown in FIGS. 1 to 4 except for differences in an arrangement structure of the second flexible circuit film FF2 and the second printed circuit board PCB2 and shapes of the first support portion 310 and the bottom cover 210. Therefore, redundant explanations will be omitted.

Referring to FIGS. 6 and 7, the second flexible circuit film FF2 is disposed on one side of the first printed circuit board PCB1. The second flexible circuit film FF2 extends upward about the Z-axis and is adjacent to the third support portion 330 and bent downward about the Z-axis. The second flexible circuit film FF2 is connected to the second printed circuit board PCB2. In this case, the second printed circuit board PCB2 is mounted on the protruding support portion 314 formed on the first support portion 310.

In this case, referring to the display device shown in FIG. 4, the second flexible circuit film FF2 extends downward about the Z-axis and is then bent upward and connected to the second printed circuit board PCB2. In general, since the first flexible circuit film FF1 is disposed adjacent to the bottom of the first support portion 310, in a structure in which the second flexible circuit film FF2 extends downward and then is bent, the second flexible circuit film FF2 may protrude downward compared to the first support portion 310. However, referring to FIG. 7, in the display device according to another exemplary embodiment of the present disclosure, the second flexible circuit film FF2 extends upward about the Z-axis and then is bent downward and connected to the second printed circuit board PCB2. Through this structure, an area where the second flexible circuit film FF2 is bent can be secured, and the second flexible circuit film FF2 can be prevented from being exposed to the bottom of the first support portion 310. Through this, a bezel size in the bottom of the display device can be reduced, and accordingly, a height of the bottom cover 220 can also be reduced, thereby improving an external appearance of the display device.

Figure 8A:
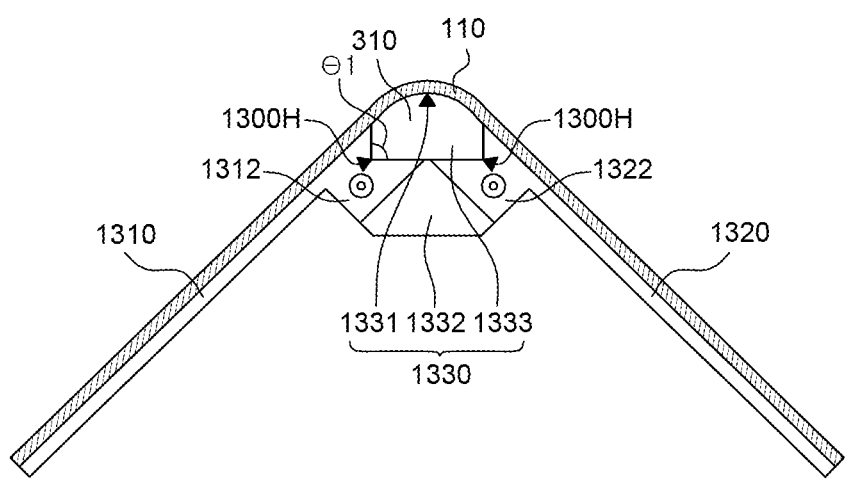
FIGS. 8A to 8C are schematic views of a display device according to still another exemplary embodiment of the present disclosure.
Figure 8B:
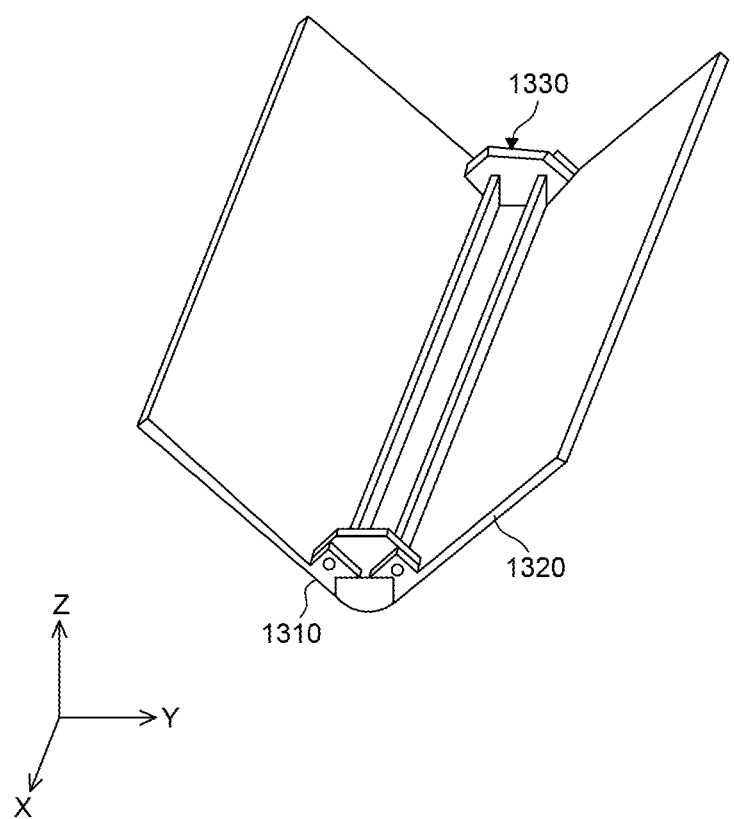
Figure 8C:
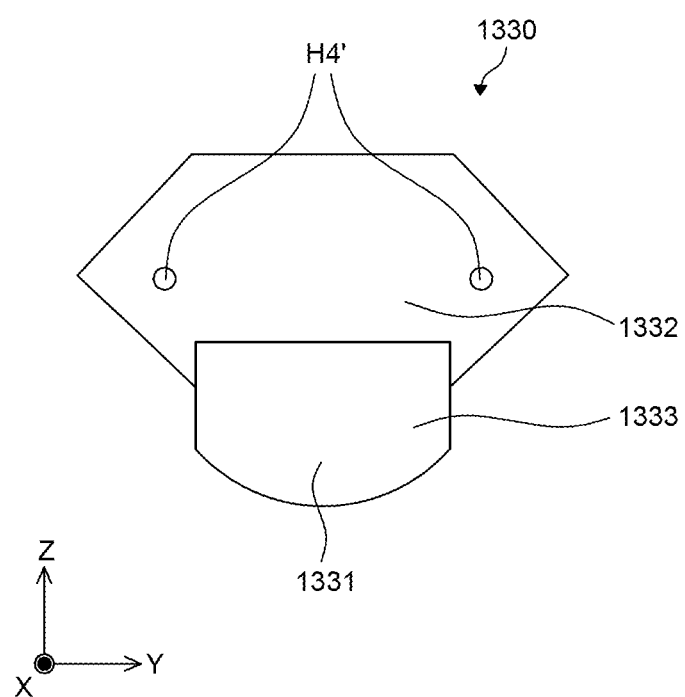

FIGS. 8A to 8C are schematic views of a display device according to still another exemplary embodiment of the present disclosure.

FIG. 8A is a schematic side view of a display device according to still another exemplary embodiment of the present disclosure. FIG. 8B is a schematic perspective view of the display device according to still another exemplary embodiment of the present disclosure. FIG. 8C is a side view specifically illustrating a third support portion constituting a display device according to still another exemplary embodiment of the present disclosure.

The display device shown in FIGS. 8A to 8C is substantially identical to the display device shown in FIGS. 1 to 4, except for differences in shapes of a first support portion 1310, a second support portion 1320, and a third support portion 1330. Accordingly, for convenience of explanation, only the display panel 100, the first support portion 1310, the second support portion 1320, and the third support portion 1330 are shown among components of the display device, and duplicate descriptions will be omitted.

Referring to FIGS. 8A and 8B, the first support portion 1310, the second support portion 1320, and the third support portion 1330 are fastened to each other, and the first support portion 1310 and the second support portion 1320 have a shape in which they open at a predetermined angle about the third support portion 1330.

Referring to FIGS. 8A and 8C, the third support portion 1330 includes a curved portion 1331, side portions 1332, and a protrusion portion 1333.

The curved portion 1331 has an upper surface with a specific curvature in the Z-axis direction. The curved portion 1331 contacts the rear surface of the display panel 100 corresponding to the folding area FA and supports the display panel in a folded form. The curved portion 1331 supports the display panel 100 so that the curvature of the folding area FA is kept constant, thereby preventing deformation of the display panel 100 located in the folding area FA due to external force. The curved portion 1331 elongates and extends in the X-axis direction, which is the folding axis direction.

A pair of the side portions 1332 are located on both sides in the X-axis direction. The side portion 1332 is a component to be fastened to the first support portion 1310 and the second support portion 1320, and includes two fourth fastening holes H4' that may be respectively connected to the first fastening units 1312 of the first support portion 1310 and the first fastening units 1322 of the second support portion 1320 on one side thereof.

The protrusion portion 1333 protrudes outward from the side portion 1332 and forms a block shape. The protrusion portion 1333 fixes the first support portion 1310 to be disposed in a specific direction and determines a folding angle of the display panel 100. Referring to FIGS. 8A and 8C, a lower portion of the protrusion portion 1333 protrudes from the side portion 1332 in the X-axis direction to form edges having a specific angle ($\theta 1$) to the first support portion 1310 and the second support portion 1320, respectively. For example, an upper portion of the protrusion portion 1333 has a circular arc, and a lower portion of the protrusion portion 1333 has corners at for example 90-degree angles on both sides thereof. The protrusion portion 1333 engages with fixing portions 1300H of the first support portion 1310 and the second support portion 1320 to fix the first support portion 1310 and the second support portion 1320 so that they do not move, and determine angles formed by the first support portion 1310 and the second support portion 1320.

Similar to the display device shown in FIG. 4, the first support portion 1310 and the second support portion 1320 shown in FIGS. 8A and 8B also include first fastening units 1312 and 1322. In this case, the fixing portions 1300H disposed toward the third support portion 1330 are formed in the first fastening units 1312 and 1322. The fixing portion 1300H has a structure that engages with an edge formed at the lower portion of the protrusion portion 1333 of the third support portion 1330. Specifically, referring to FIG. 8A, the fixing portion 1300H is cut inwardly toward the third support portion 1330 and has a concave shape with a specific angle $\theta 1$. The angle $\theta 1$ of the cut surface of the fixing portion 1300H has an angle of 90 degrees, which is equal to the angle of the corner formed at the lower portion of the protrusion portion 1333 of the third support portion 1330. As a result, the protrusion portion 1333 of the third support portion 1330 and the fixing portions 1300H formed on the first fastening units 1312 and 1322 of the first support portion 1310 and the second support portion 1320 are engaged, so that the first support portion 1310 and the second support portion 1320 may be fixed. The angle $\theta 1$ of the cut surface of the fixing portion 1300H is not limited to 90 degrees, and can be any degree as long as the protrusion portion 1333 of the third support portion 1330 and the fixing portions 1300H formed on the first fastening units 1312 and 1322 of the first support portion 1310 and the second support portion 1320 are engaged.

The exemplary embodiments of the present disclosure can also be described as follows:

According to an aspect of the present disclosure, there is provided a display device. The display device comprises a display panel including a display area including a first non-folding area, a second non-folding area, and a folding area located between the first non-folding area and the second non-folding area; a first support portion supporting the first non-folding area of the display panel; a second support portion supporting the second non-folding area of the display panel; a third support portion fastened between the first support portion and the second support portion and having a rounded upper surface to support the folding area of the display panel; and a bottom cover located in a direction opposite to the third support portion and fastened to the first support portion and the second support portion.

A rear surface of the first support portion and a rear surface of the second support portion may face each other in a plane direction. The third support portion may be located above the first support portion and the second support portion in a thickness direction.

The third support portion may include a curved portion having a specific curvature and an upper surface contacting a rear surface of the display panel in the folding area; and side portions fastened to the first support portion and the second support portion.

The curved portion may include steps formed on both sides thereof so that the first support portion and an upper end of the support portion are mounted.

The display device may further comprise an adhesive member disposed between an upper surface of the first support portion and the rear surface of the display panel and between an upper surface of the second support portion and the rear surface of the display panel. A height of the step may be a sum of a thickness of the adhesive member and a thickness of the display panel.

The display panel in the first non-folding area may be disposed on an upper surface of the first support portion. The first support portion protrudes from the rear surface and may include a first fastening unit fastened to the third support portion and a second fastening unit fastened to the second support portion.

The display device may further comprise a first flexible circuit film connected to a pad portion on one side of the display panel; a first printed circuit board connected to the first flexible circuit film; a second flexible circuit film connected to the first printed circuit board; and a second printed circuit board connected to the second flexible circuit film. The first support portion may include a protruding support portion protruding from a rear surface of the first support portion and supporting the second printed circuit board to be spaced apart from the rear surface.

The first printed circuit board may be attached to the rear surface of the first support portion. The second printed circuit board may be disposed to be spaced apart by a predetermined distance from the first printed circuit board by the protruding support portion. The display panel the first printed circuit board, and the second printed circuit board in the first non-folding area may overlap one another.

The first flexible circuit film may be bent toward the rear surface of the first support portion to surround a bottom of the first support portion in a direction opposite to the third support portion. The first flexible circuit film and the second flexible circuit film may protrude outward from the bottom of the first support portion.

The first flexible circuit film may be bent toward the rear surface of the first support portion to surround the bottom of the first support portion in a direction opposite to the third support portion. The second flexible circuit film may be located between the rear surface of the first support portion and a rear surface of the second support portion, extend toward the third support portion, and bend in a direction opposite to the third support portion.

The third support portion may further include a protrusion portion protruding outward from the side portion. The first support portion may further include a first fastening unit fastened to the side portion of the third support portion. The first fastening unit may include a fixing portion engaged with the protrusion portion.

The protrusion portion may have an edge having a specific angle toward the first support portion. The fixing portion may have a structure cut inward at an angle equal to the angle of the edge of the protrusion portion.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a display panel including a display area having a first non-folding area, a second non-folding area, and a folding area located between the first non-folding area and the second non-folding area;
a first support configured to support the first non-folding area of the display panel;
a second support coupled to the first support and configured to support the second non-folding area of the display panel;
a third support coupled to the first support and the second support, the third support disposed between the first support and the second support and having a curved upper surface configured to support the folding area of the display panel in a curved shape, the third support including:

a curved portion having the curved upper surface, wherein the curved portion is in contact with a rear surface of the display panel in the folding area; and side portions coupled to the first support and the second support, wherein the curved portion includes steps on both sides thereof that receive an upper end of the first support and an upper end of the second support; and an adhesive member disposed between an upper surface of the first support and the rear surface of the display panel and between an upper surface of the second support and the rear surface of the display panel, wherein a height of the steps is a sum of a thickness of the adhesive member and a thickness of the display panel.

2. The display device of claim 1, further comprising:
a bottom cover coupled to the first support and the second support on an opposite side of the first support and the second support from the third support.

3. The display device of claim 2, wherein the bottom cover is configured to be attached to a structure outside the display device.

4. The display device of claim 1, wherein a rear surface of the first support and a rear surface of the second support face each other in a plane direction, and wherein the third support is located above the first support and the second support in a thickness direction.

5. The display device of claim 1, wherein an upper surface of the adhesive member and an end of the curved portion form a straight line.

6. The display device of claim 1, wherein the first non-folding area of the display panel is disposed on an upper surface of the first support, and wherein the first support includes a rear surface having at least one protrusion, a first fastener coupled to the third support, and a second fastener coupled to the second support.

7. The display device of claim 1, further comprising:
a first flexible circuit film connected to a pad portion on one side of the display panel; and
a first printed circuit board connected to the first flexible circuit film.

8. The display device of claim 7, further comprising:
a second flexible circuit film connected to the first printed circuit board; and
a second printed circuit board connected to the second flexible circuit film, wherein the first support includes a protrusion extending from a rear surface of the first support and configured to support the second printed circuit board spaced apart from the rear surface of the first support.

9. The display device of claim 7, wherein the first printed circuit board is attached to the rear surface of the first support, and wherein the second printed circuit board is disposed to be spaced apart from the first printed circuit board by the protrusion of the first support, and wherein the display panel, the first printed circuit board, and the second printed circuit board overlap one another in the first non-folding area.

10. The display device of claim 8, wherein the first flexible circuit film is bent toward the rear surface of the first support to surround a bottom of the first support in a direction opposite to the third support, and wherein the first flexible circuit film and the second flexible circuit film protrude outward from the bottom of the first support.

11. The display device of claim 8, wherein the first flexible circuit film is bent toward the rear surface of the first support to surround the bottom of the first support in a direction opposite to the third support, and wherein the second flexible circuit film is located between the rear surface of the first support and a rear surface of the second support, extends toward the third support, and bends in a direction opposite to the third support.

12. The display device of claim 1, wherein the third support further includes a protrusion extending outward from at least one of the side portions, wherein the first support further includes a first fastener coupled to the at least one of the side portions of the third support, and wherein the first fastener includes a fixing portion engaged with the protrusion of the third support.

13. The display device of claim 12, wherein the protrusion of the third support has an edge angled toward the first support, and wherein the fixing portion is angled inward at an angle equal to the angle of the edge of the protrusion of the third support.

14. A display device, comprising:
a display panel including a display area having a first non-folding area, a second non-folding area, and a folding area located between the first non-folding area and the second non-folding area;
a support assembly coupled to the display panel, including:
a first support plate configured to maintain the first non-folding area of the display panel in a flat state;
a second support plate coupled to the first support plate and configured to maintain the second non-folding area of the display panel in a flat state; and
a curved support coupled to the first support plate and the second support plate and configured to maintain the folding area of the display panel in a curved shape, wherein the curved support includes a curved portion having a curved upper surface and the curved portion is in contact with a rear surface of the display panel in the folding area, the curved support further including side portions coupled to the first support plate and the second support plate, wherein the curved portion includes steps on both sides thereof that receive an upper end of the first support plate and an upper end of the second support plate; and
an adhesive member disposed between an upper surface of the first support plate and the rear surface of the display panel and between an upper surface of the second support plate and the rear surface of the display panel, wherein a height of the steps is a sum of a thickness of the adhesive member and a thickness of the display panel, and
wherein the first support plate and the second support plate are spaced from each other across the curved support.

15. The display device of claim 14, further comprising:
a bottom cover coupled to a lower end of the first support and a lower end of the second support.

16. The display device of claim 14, wherein the first support plate and the second support plate each include a flat outer surface and an angled upper surface, wherein the angled upper surface of each of the first support plate and the second support plate are configured to mate with corresponding angled lower surfaces of the curved support to provide a constant and uniform change in shape between the flat outer surfaces of the first support plate and the second support plate and the curved support.

* * * * *